Dec. 30, 1947.      F. J. METZGER      2,433,524
CONTINUOUS PRODUCTION OF ALDOL
Filed April 14, 1944
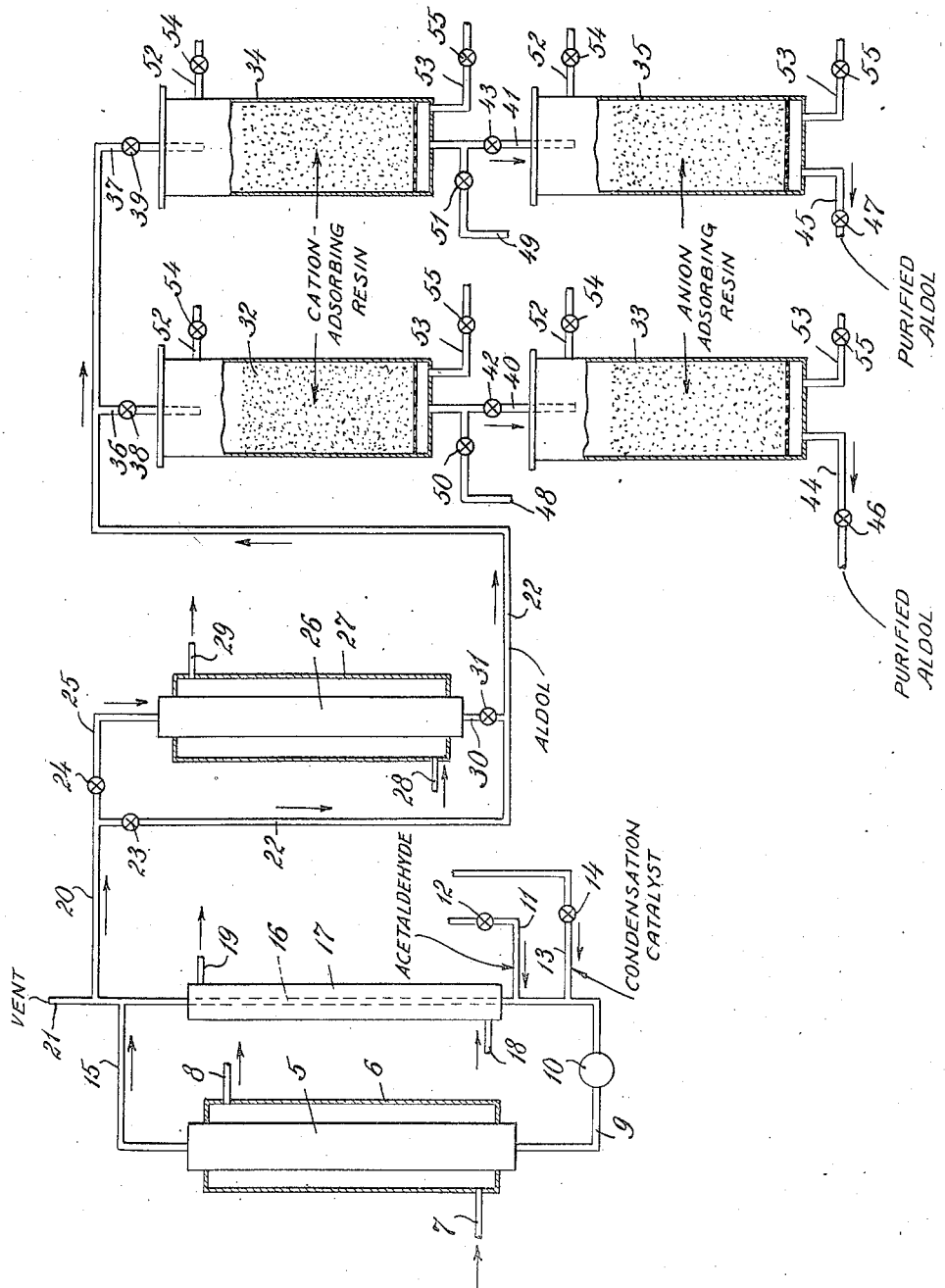
INVENTOR.
Floyd J. Metzger
BY
Pennie Davis Marvin & Edmonds
ATTORNEY.

Patented Dec. 30, 1947

2,433,524

UNITED STATES PATENT OFFICE 2,433,524

CONTINUOUS PRODUCTION OF ALDOL

Floyd J. Metzger, New York, N. Y., assignor to Air Reduction Company, Incorporated, New York, N. Y., a corporation of New York Application April 14, 1944, Serial No. 531,063

6 Claims. (Cl. 260—602)

This invention relates to the manufacture of aldol and particularly to a continuous method of condensing acetaldehyde to produce aldol in a commercially practicable and economical manner.

Aldol is formed by the condensation of two molecules of acetaldehyde in the presence of an alkaline agent such as an alkali metal hydroxide or a carbonate or an alkaline earth metal oxide. When the condensation has been effected, it is necessary to eliminate the alkaline agent. Furthermore the product may contain small amounts of salts which likewise should be removed in order to afford a pure product.

The desired reaction is exothermic and liberates considerable quantities of heat, i. e. 235 B. t. u. per pound of acetaldehyde condensed. The liberation of the heat and the resulting rise in temperature if the heat is not promptly removed are irregular and difficult to control. If the temperature is not controlled effectively, the increase in temperature will accelerate the reaction, with the result that additional heat is released. There is a marked tendency for the reaction to proceed to the point where all of the acetaldehyde is converted to a useless water insoluble resin.

If, during the reaction, the temperature is allowed to rise excessively or the time of reaction is unduly prolonged, the product is contaminated with substances of higher molecular weight than aldol, such as higher polymers of aldol and aldehyde resins. These side reactions decrease the yield of aldol and result in a product of poor quality. Since the distillation of aldol may be carried out only with considerable difficulty and loss, the separation of higher boiling products from aldol is not economically feasible.

Because of the difficulty of controlling the reaction, aldol has been prepared by a batch procedure. It has been suggested that control may be more readily effected by diluting the acetaldehyde with water. This procedure introduces the further difficulty that the aldol contains a large quantity of water which must be removed subsequently at considerable cost.

It is the object of the present invention to provide an effective and economical method of producing aldol by condensation which avoids the difficulties mentioned and particularly facilitates the elimination of the alkaline catalyst and the removal of salts, if any are present.

Other objects and advantages of the invention will be apparent as it is better understood by reference to the following specification and the accompanying drawing, which illustrates diagrammatically an apparatus suitable for the practice of the invention.

In application Serial No. 475,622, filed February 12, 1943, now Patent No. 2,376,070, of which this application is a continuation-in-part, I have disclosed a continuous method of producing aldol by the condensation of acetaldehyde by cycling a solution of acetaldehyde in aldol through a temperature-controlled reaction chamber and adding acetaldehyde and an alkaline catalyst to the cycled solution. The dilution of the acetaldehyde with aldol restrains the vigor of the condensation reaction and particularly the irregular liberation of heat therefrom. It is possible, therefore, to remove the heat effectively and to maintain the desired temperature of the reaction within practical limits.

In accordance with the procedure described in my earlier application, an amount of the solution equivalent to the additions is withdrawn continuously from the cycle and neutralized with an acid such as acetic acid to prevent further reaction. This solution, principally aldol, will contain some unreacted acetaldehyde, a small amount of water, and the neutralized catalyst, but it is free from undesirable higher polymerization products of aldol.

In accordance with the present invention, the neutralization of the aldol with acid is avoided. I utilize instead a cation adsorbing resin to eliminate the alkali. Even though no acid is added as a neutralizing agent, the aldol may contain small amounts of salts and to eliminate such salts I find it desirable to pass the solution through an anion adsorbing resin from which the solution is delivered in a neutral form free from contaminating salts.

As ion-exchange resins, I may use any such resins which are adapted for the purpose. Products of this type are well known, for example Ionac A-293 and Ionac C-284 (American Cyanamid Company) and Amberlite IR-1 and Amberlite IR-4 (Resinous Products & Chemical Company). Ionac A-293 and Amberlite IR-4 are anion adsorbing resins, and Ionac C-284 and Amberlite IR-1 are cation adsorbing resins.

The temperature of the reaction must be controlled within relatively narrow limits, and preferably within the range of 20° to 40° C. It may be somewhat lower or higher. At a temperature of 15° C., the reaction is ordinarily too slow, and at a temperature of 50° C. it tends to be too rapid. Normally, as hereinbefore indicated, it is extremely difficult to control the temperature of the reaction, but by conducting it in the manner indicated, no difficulty is experienced in holding the temperature within the desired range by means of ordinary cooling devices such as a jacketed vessel, a coil within a cooling bath, or multiple tubes surrounded by a cooling medium. Water or any other suitable liquid may be used as the cooling agent.

The catalyst employed may be any of the usual alkaline agents such as the hydroxides or carbonates of the alkali metals or the oxides of the alkaline earth metals or similar agents. Sodium hydroxide is the preferred catalyst. The amount of catalyst employed will depend to some extent upon the amount of free acid contained in the acetaldehyde. Freshly distilled acetaldehyde contains little or no free acid, but on standing, especially in contact with the oxygen of the air, acetic acid is formed and must be neutralized before the catalyst becomes effective. Such neutralization will introduce the salts hereinbefore mentioned. The amount of catalyst to be used will depend somewhat upon the conditions, but I have found it advantageous to conduct the condensation within a pH range of 9–11. The catalyst is added preferably in the form of a water solution, but if desired it may be added in non-aqueous solution, for example in alcoholic solution.

The rate at which the solution of acetaldehyde in aldol is circulated, the rate of feed of acetaldehyde thereto, and the temperature of the reaction are all mutually dependent, inasmuch as a variation in one may be counter-balanced by the proper change in one or both of the other variables. For instance, a higher feed rate which would tend to increase the heat of reaction may be balanced by an increase in cycle rate or by lowering the jacket temperature or both.

Referring to the drawing, 5 indicates the reaction chamber having a jacket 6 which may be supplied with water or other cooling agent through a pipe 7. The cooling agent escapes through a pipe 8. A mixture of approximately 60% aldol and 40% acetaldehyde is introduced to the reaction chamber 5 through a pipe 9 by a pump 10 which maintains the circulation. The cycle system must be substantially filled with this mixture in order that proper cycling through the cooling devices may be ensured. A sufficient amount of a solution of the catalyst to give a pH of 9–11 to the cycling mixture is introduced from a suitable source through pipe 13 controlled by valve 14. Acetaldehyde is continuously fed from a suitable source through pipe 11 controlled by valve 12, and sufficient catalyst solution is continuously fed in the manner above cited to maintain a pH of 9–11 within the cycled solution. In the reaction chamber 5, the acetaldehyde is condensed at a temperature controlled within the desired range by the circulation of the cooling agent through the jacket 6.

The solution escapes through a pipe 15 and is returned through a pipe 16 surrounded by a jacket 17 through which water or other cooling agent is circulated by means of the pipes 18 and 19. The solution thus returns with additions of acetaldehyde and the water solution of the catalyst through the pump 10 to the reaction chamber 5. The rate of circulation is maintained to ensure the most effective reaction. A portion of the solution is withdrawn continuously through a pipe 20 which is connected with a vent 21 and is delivered to a pipe 22.

In the event that additional reaction is desired, a valve 23 in the pipe 22 is closed and a valve 24 in a branch pipe 25 is opened to deliver the solution to an auxiliary reaction chamber 26 provided with a jacket 27 and pipes 28 and 29 to permit the circulation of water or other cooling media. The reaction continues in the chamber 26 under controlled temperature conditions substantially as in the reaction chamber 5, with the result that a higher proportion of aldol is produced. The solution is delivered through a pipe 30 controlled by a valve 31 to the pipe 22.

To effect removal of the alkaline catalyst and the salts, if any, I provide two sets of towers comprising towers 32, 33, 34 and 35. The towers 32 and 34 are connected to the pipe 22 by branches 36 and 37 controlled by valves 38 and 39. The towers 32 and 34 are connected to the towers 33 and 35 by pipes 40 and 41 controlled by valves 42 and 43. Outlet pipes 44 and 45 controlled by valves 46 and 47 are provided at the bottoms of the towers 33 and 35 to permit withdrawal of the purified aldol. Outlet connections 48 and 49 controlled by valves 50 and 51 are connected to the pipes 40 and 41 to permit withdrawal of aldol if no salts are present. Each of the towers is provided with connections 52 and 53 controlled by valves 54 and 55 to permit the passage of revivifying solutions in the manner hereinafter described.

The towers 32 and 34 are filled with a suitable cation adsorbing resin, and the towers 33 and 35 are similarly filled with an anion adsorbing resin. As will be readily apparent, by manipulation of the valves, the solution from the pipe 22 may be directed through the towers 32 and 33 or the towers 34 and 35 depending on which is in active operation while the other is subjected to revivification. Also, the solution can be withdrawn after passing through the cation adsorbing resin, it being unnecessary to employ the anion adsorbing resin if salts are absent. Thus the aldol delivered to the pipe 22 is readily freed from the alkaline catalyst and also from salts, if any are present, and the purified product is withdrawn continuously and without the necessity for the addition of acid and the further treatment to remove products of the neutralization.

After the resins have become spent, they may be regenerated in the usual manner. The cation removing resin is used as a hydrogen exchanger, that is, it replaces the metallic ions such as sodium, calcium, etc., with a hydrogen ion. Such a spent resin is therefore activated by means of a dilute acid solution, and I prefer to use acetic acid for this purpose. The acid may be introduced through the pipe 52 and withdrawn through the pipe 53 in revivifying the catalyst in either of the towers 32 and 34. Regeneration of the anion removing resin is carried out by introducing a dilute alkaline solution such as sodium carbonate or sodium hydroxide through the pipes 52 to the towers 33 and 35. I prefer sodium carbonate solutions. Concentrations of 2%–10% of the regenerative materials give satisfactory results.

As an example of the invention, assuming an apparatus as described with a reaction chamber, return pipe, circulating pump and other necessary feed and exit lines, having a volume of approximately $\frac{1}{10}$ cubic foot and a cooling surface of approximately 1¾ square feet filled with a 60% aldol–40% acetaldehyde solution containing a sufficient amount of catalyst in the form of a water solution of sodium hydroxide to give a pH of approximately 10 to the reaction mixture, the pump may be operated to cycle the solution through the reaction chamber at the rate of approximately 100 gallons per hour while the temperature of the reaction chamber is held at approximately 30° C. To this system is fed continuously acetaldehyde of a commercial grade at the rate of approximately 6.0 pounds per hour and 4.5% aqueous sodium hydroxide at the rate of about 0.55 pound per hour. From the cycle approximately 6.55 pounds per hour of the reaction mixture are withdrawn, having a specific gravity at 15° C. of about 1.065. This solution, containing about 0.6675 gram of dissolved solids per 100 cc. treated with acetic acid-regenerated, well-washed Ionac C-284 to remove the inorganic cations followed by treatment with sodium carbonate-regenerated, well-washed Ionac A-293, to remove free acids produced aldol containing 0.0034 gram of dissolved solids per 100 cc. This represented the removal of 99.5% of the original solids and afforded a product sufficiently pure for commercial purposes.

The foregoing example is merely illustrative of the preferred conditions of operation. The invention does not depend upon the use of any particular catalyst, though alkaline catalysts are preferred. The rates of feed and the quantities of materials introduced to the system and likewise the amount withdrawn therefrom can be varied over wide ranges without materially altering the results attained.

The invention affords a simple and effective procedure permitting continuous production of aldol free from higher boiling impurities and also free from dissolved solids. It avoids the high cost of batch operations and the difficulties inherent in the addition of large quantities of water to the solution.

Various changes may be made in the procedure and the apparatus without departing from the invention or sacrificing the advantages thereof.

I claim:

1. The method of producing aldol by condensation of acetaldehyde, which comprises maintaining a body of a solution of acid-free acetaldehyde and an alkali-metal hydroxide catalyst in aldol, controlling the temperature of said body of solution, substantially continuously withdrawing a portion of the solution from said body, adding acid-free acetaldehyde and an alkali-metal hydroxide catalyst to a part of the withdrawn portion of the solution, returning such part of the solution to which the acetaldehyde and catalyst were added to said body of solution, passing another part of the withdrawn portion of the solution after condensation of the acetaldehyde thereof substantially is complete through a cation adsorbing resin to substitute hydrogen ion for the metallic ion of the catalyst, and recovering the resulting metallic-ion-free aldol solution.

2. The method of producing aldol by condensation of acetaldehyde, which comprises maintaining a body of a solution of acetaldehyde and an alkaline catalyst in aldol, controlling the temperature of said body of solution, substantially continuously withdrawing a portion of the solution from said body, adding acetaldehyde and alkaline catalyst to a part of the withdrawn portion of the solution, returning such part of the solution to which the acetaldehyde and alkaline catalyst were added to said body of solution, passing another part of the withdrawn portion of the solution after condensation of the acetaldehyde thereof substantially is complete through a cation adsorbing resin to substitute hydrogen ion for the metallic ion of the catalyst, thereafter passing such metallic ion-free solution through an anion adsorbing resin to eliminate acids therefrom, and recovering the resulting metallic-ion-free and demineralized aldol solution.

3. The method of producing aldol by condensation of acetaldehyde, which comprises maintaining a body of a solution of acid-free acetaldehyde and an alkali-metal hydroxide catalyst in aldol, controlling the temperature of said body of solution, substantially continuously withdrawing a portion of the solution from said body, adding acid-free acetaldehyde and an alkali-metal hydroxide catalyst to a part of the withdrawn portion of the solution, returning such part of the solution to which the acetaldehyde and catalyst were added to said body of solution, the amount of alkali-metal hydroxide catalyst added to the returned part of the withdrawn solution being sufficient to maintain a pH of from about 9 to 11 in said body of solution, passing another part of the withdrawn portion of the solution after condensation of the acetaldehyde thereof substantially is complete through a cation adsorbing resin to substitute hydrogen ion for the metallic ion of the catalyst, and recovering the resulting metallic-ion-free aldol solution.

4. The method of producing aldol by condensation of acetaldehyde, which comprises maintaining a body of a solution of acetaldehyde and an alkaline catalyst in aldol, controlling the temperature of said body of solution, substantially continuously withdrawing a portion of the solution from said body, adding acetaldehyde and alkaline catalyst to a part of the withdrawn portion of the solution, returning such part of the solution to which the acetaldehyde and alkaline catalyst were added to said body of solution, the amount of alkaline catalyst added to the returned part of the withdrawn solution being sufficient to maintain a pH of from about 9 to 11 in said body of solution, passing another part of the withdrawn portion of the solution after condensation of the acetaldehyde thereof substantially is complete through a cation adsorbing resin to substitute hydrogen ion for the metallic ion of the catalyst, thereafter passing such metallic ion-free solution through an anion adsorbing resin to eliminate acids therefrom, and recovering the resulting metallic-ion-free and demineralized aldol solution.

5. The method of producing aldol by condensation of acetaldehyde, which comprises maintaining a body of a solution of acid-free acetaldehyde and an alkali-metal hydroxide catalyst in aldol, controlling the temperature of said body of solution, substantially continuously withdrawing a portion of the solution from said body, adding acid-free acetaldehyde and alkali-metal hydroxide catalyst to a part of the withdrawn portion of the solution, returning such part of the solution to which the acetaldehyde and catalyst were added to said body of solution, maintaining another part of the solution under conditions such that condensation of the acetaldehyde therein continues for a further period of time, and passing such other part of the withdrawn portion of the solution after condensation of the acetaldehyde thereof substantially is complete through a cation adsorbing resin to substitute hydrogen ion for the metallic ion of the catalyst, and recovering the resulting metallic-ion-free aldol solution.

6. The method of producing aldol by condensation of acetaldehyde, which comprises maintaining a body of a solution of acetaldehyde and an alkaline catalyst in aldol, controlling the temperature of said body of solution, substantially continuously withdrawing a portion of the solution from said body, adding acetaldehyde and alkaline catalyst to a part of the withdrawn portion of the solution, returning such part of the solution to which the acetaldehyde and alkaline catalyst were added to said body of solution, maintaining another part of the withdrawn solution under conditions such that condensation of the acetaldehyde therein continues for a further period of time, passing such other part of the withdrawn portion of the solution after condensation of the acetaldehyde thereof substantially is complete through a cation adsorbing resin to substitute hydrogen ion for the metallic ion of the catalyst, thereafter passing such metallic ion-free solution through an anion adsorbing resin to eliminate acids therefrom, and recovering the resulting metallic-ion-free and demineralized aldol solution.

FLOYD J. METZGER.

REFERENCES CITED

The following references are of record in the file of this patent:

UNITED STATES PATENTS

| Number | Name | Date |
| --- | --- | --- |
| 1,598,522 | Herrly | Aug. 31, 1926 |
| 2,286,037 | Loder | June 9, 1942 |
| 2,228,514 | Griessbach | Jan. 14, 1941 |
| 2,258,216 | Ramage | Oct. 7, 1941 |
| 2,376,070 | Metzger | May 15, 1945 |

OTHER REFERENCES

Tiger et al., "Industrial and Engineering Chemistry," vol. 35, pp. 186–192 (1943).